(12) United States Patent
Kang et al.

(10) Patent No.: US 10,151,282 B2
(45) Date of Patent: Dec. 11, 2018

(54) ACTUATOR FOR INTAKE MANIFOLD

(71) Applicant: HYUNDAI KEFICO CORPORATION, Gyeonggi-do (KR)

(72) Inventors: Hun Cheol Kang, Gyeonggi-do (KR); Sang Hoon Park, Gyeonggi-do (KR); Byung Sam So, Gyeonggi-do (KR)

(73) Assignee: HYUNDAI KEFICO CORPORATION (KR)

( * ) Notice: Subject to any disclaimer, the term of this patent is extended or adjusted under 35 U.S.C. 154(b) by 31 days.

(21) Appl. No.: 14/901,498

(22) PCT Filed: Jun. 26, 2014

(86) PCT No.: PCT/KR2014/005717
§ 371 (c)(1),
(2) Date: Dec. 28, 2015

(87) PCT Pub. No.: WO2014/209046
PCT Pub. Date: Dec. 31, 2014

(65) Prior Publication Data
US 2016/0369753 A1  Dec. 22, 2016

(30) Foreign Application Priority Data

Jun. 27, 2013 (KR) .................. 10-2013-0074249

(51) Int. Cl.
*F02M 35/10* (2006.01)
*F02M 35/104* (2006.01)
(Continued)

(52) U.S. Cl.
CPC ....... *F02M 35/10118* (2013.01); *F02B 27/02* (2013.01); *F02M 35/104* (2013.01);
(Continued)

(58) Field of Classification Search
CPC ....... F02M 35/10072; F02M 35/10118; F02M 35/10301; F02B 27/02; F02D 9/18
(Continued)

(56) References Cited

U.S. PATENT DOCUMENTS 6,695,279 B2 * 2/2004 Takahashi ........... F02B 27/0284
137/907
7,114,477 B2 * 10/2006 Shin ...................... F02D 9/1065
123/184.47
(Continued)

FOREIGN PATENT DOCUMENTS

CN  1626784 A  6/2005
CN  201786459 U  4/2011
(Continued)

OTHER PUBLICATIONS

International Search Report for Application No. PCT/KR2014/005717 dated Oct. 23, 2014.
(Continued)

*Primary Examiner* — Jacob Amick
*Assistant Examiner* — Charles Brauch
(74) *Attorney, Agent, or Firm* — Tarolli, Sundheim, Covell & Tummino LLP

(57) ABSTRACT

Disclosed herein is an actuator for an intake manifold, wherein the actuator may include: a housing having a negative pressure space; an operating unit operated by the pressure of air introduced into and discharged from the negative pressure space, and rotating the variable valve; an exhaust flow path connected to an external negative pressure supply source; an intake flow path receiving external air which raises the pressure of the negative pressure space; a spool hole formed in the housing so as to communicate with the exhaust flow path and the intake flow path; an air entry and exit flow path formed in the housing so as to communicate with the negative pressure space and the spool hole;
(Continued)

a valve body selectively opening/closing the exhaust flow path and the intake flow path; and a solenoid unit operating the valve body.

4 Claims, 9 Drawing Sheets

(51) Int. Cl.
    *F02B 27/02*     (2006.01)
    *F02M 35/116*     (2006.01)
    *F02D 9/18*     (2006.01)

(52) U.S. Cl.
    CPC   *F02M 35/10032* (2013.01); *F02M 35/10072* (2013.01); *F02M 35/10111* (2013.01); *F02M 35/10255* (2013.01); *F02M 35/116* (2013.01); *F02D 9/18* (2013.01); *F02M 35/10301* (2013.01); *Y02T 10/146* (2013.01)

(58) Field of Classification Search
    USPC .................................................. 123/184.56
    See application file for complete search history.

(56) References Cited

U.S. PATENT DOCUMENTS

2009/0224192 A1*   9/2009   Oikawa ............... F16K 11/0716
    251/129.15
2010/0294227 A1*   11/2010   Magnan ................ F02B 31/085
    123/184.55
2010/0294966 A1*   11/2010   Czimmek ............... F02B 37/16
    251/129.15

FOREIGN PATENT DOCUMENTS

| CN | 202832800 U | 3/2013 |
|---|---|---|
| DE | 1579524 | 11/1966 |
| DE | 3201071 C2 | 7/1983 |
| DE | 4426161 A1 | 2/1996 |
| JP | 3828764 B2 | 10/2006 |
| JP | 4249547 B2 | 4/2009 |
| KR | 20-1999-0019380 U | 6/1999 |
| KR | 10-2008-0052064 A | 6/2008 |
| WO | 2009/108532 A1 | 9/2009 |

OTHER PUBLICATIONS

Office Action for Chinese Application No. 201480037037 dated Jun. 9, 2017.

German Office Action corresponding to DE Patent Application No. 112014003048.1, dated Feb. 6, 2018.

\* cited by examiner

ACTUATOR FOR INTAKE MANIFOLD

TECHNICAL FIELD

Exemplary embodiments of the present invention relate to an actuator for an intake manifold, and more particularly, to an actuator for an intake manifold, which rotates a variable valve arranged in a runner of an intake manifold of a vehicle such that an air intake path can be variably changed in the runner.

BACKGROUND ART

In general, an intake manifold of a vehicle is mounted at the head of an engine and serves to supply air and fuel required for combustion of the engine into a cylinder.

Such an intake manifold has an air inlet formed at one side thereof, through which air is introduced from outside, and the air inlet has a throttle body mounted thereon such that air is introduced through the throttle body. The intake manifold includes a plenum chamber which provides a predetermined space in which the introduced air can stay. Furthermore, the intake manifold includes branched flow paths, that is, a plurality of runners formed at one side of the plenum chamber so as to properly distribute and guide air to a plurality of cylinders.

Since the intake manifold has a large influence on the volume efficiency and output of the engine, a variety of researches have been conducted on the intake manifold. Furthermore, since air mixture passed through the intake manifold does not normally flow but intermittently flows at each cycle, the intake manifold must be designed in consideration of pulsation or interference, in order to increase the volume efficiency.

Meanwhile, the amount of air mixture introduced through the intake manifold is related to the operation condition of the engine. Thus, when the operation range of the engine corresponds to a low-speed and low-load range, a small amount of air mixture flow is required, and when the operation range of the engine corresponds to a high-speed and high-load range, a large amount of air mixture flow is required within a short time, while intake resistance is minimized. For this reason, a variable intake manifold has been recently developed, which is variably controlled according to the operation state of the engine.

Recently, research has been actively conducted on a variable intake manifold to which a VIS (Variable Intake System) is applied. The variable intake manifold can variably adjust the volume of a runner according to the operation condition of an engine, in order to increase the efficiency of the engine. As the volume of the variable intake manifold is variably adjusted according to the operation condition of the engine, the improvement in torque and performance of the engine can be expected.

Such a variable intake manifold is disclosed in Korean Patent Laid-open Publication Nos. 10-2005-0115072 and 10-2006-0003513.

FIG. 1 is a perspective view of a conventional actuator for an intake manifold, FIG. 2 is an expanded view of the actuator for the intake manifold of FIG. 1, and FIG. 3 is an exploded view of the actuator for the intake manifold of FIG. 1.

Referring to FIGS. 1 to 3, the conventional actuator 100 for an intake manifold includes a solenoid valve 110, a vacuum actuator 120, a first flow path 130, and a second flow path 140. The solenoid valve 110 is installed outside the intake manifold 101. The actuator 100 for the intake manifold rotates a valve arranged in a runner of the intake manifold 101 such that an air intake path can be variably changed in the runner. That is, the actuator 100 for the intake manifold may variably control the air intake path inside the intake manifold 101 through the vacuum actuator 120 which is coupled to the valve so as to rotate the valve.

The solenoid valve 110 is coupled to one side of the outside of the intake manifold 101. The solenoid valve 110 includes an intake port 111 and an exhaust port 112. The intake port 111 is connected to the vacuum actuator 120 through a first flow path 130, and the exhaust port 112 is connected to the intake manifold 101 through a second flow path 140. The solenoid valve 110 further includes a bracket 113 fixed to the intake manifold 101.

The vacuum actuator 120 is arranged on a side surface of the outside of the intake manifold 101, and coupled to the valve arranged in the intake manifold 101 through an operating bar 125. The vacuum actuator 120 may have a vacuum state formed through the solenoid valve 110. When the vacuum actuator 120 is set in the vacuum state, the vacuum actuator 120 rotates the valve arranged in the intake manifold 101.

The first flow path 130 connects the intake port 111 of the solenoid valve 110 to the vacuum actuator 120 outside the intake manifold 101. The second flow path 140 connects the exhaust port 112 of the solenoid valve 110 and the intake manifold 101 to each other. That is, the solenoid valve 110 and the vacuum actuator 120 are coupled to the outside of the intake manifold 101, and the actuator 100 for an intake manifold includes two or more flow paths which communicate with the vacuum actuator 120 through the solenoid valve 110 from the intake manifold 101.

The actuator 100 for an intake manifold requires the first flow path 130 connected to the vacuum actuator 120 from the solenoid valve 110 and the second flow path 140 connected to the solenoid valve 110 from the intake manifold 101. That is, the actuator 100 for an intake manifold has a complex structure in which two or more flow paths are formed outside the intake manifold 101. Furthermore, since the actuator 100 for an intake manifold requires a separate bracket 113 for fixing the solenoid valve 110 to the intake manifold 101, the actuator 100 has a complex structure, and inevitably increases in weight.

DISCLOSURE

Technical Problem

The present invention has been made in view of the above problems, and it is an object of the present invention to provide an actuator for an intake manifold, which is capable of simplifying and shortening a flow path for driving an operating unit, thereby reducing the weight and improving the response performance of an operating unit.

Technical Solution

In accordance with one aspect of the present invention, there is provided an actuator for an intake manifold, which rotates a variable valve arranged in a runner of an intake manifold of a vehicle so as to variably change an air intake path in the runner. The actuator may include: a housing having a negative pressure space in which negative pressure is formed; an operating unit operated by the pressure of air introduced into and discharged from the negative pressure space, and rotating the variable valve; an exhaust flow path formed at one side of the housing, and connected to an external negative pressure supply source through an exhaust pipe such that negative pressure is formed in the negative pressure space; an intake flow path formed in the housing, and receiving external air which raises the pressure of the negative pressure space; a spool hole formed in the housing so as to communicate with the exhaust flow path and the intake flow path, and housing a valve body therein; an air entry and exit flow path formed in the housing so as to communicate with the negative pressure space and the spool hole; a valve body slidably installed in the spool hole, and selectively opening/closing the exhaust flow path and the intake flow path; and a solenoid unit operating the valve body.

The housing may be over-molded to surround the outside of the solenoid unit.

The solenoid unit may include: a coil wound around the outside of a core; the core moving the valve body using an electromagnetic force generated when a current is applied to the coil; and an elastic member restoring the valve body.

The intake flow path may be formed through the core.

The operating unit may include: an operating member deformed by the pressure of the air introduced into and discharged from the negative pressure space; an operating bar fixed and coupled to the operating member and the variable valve; and an elastic spring restoring the operating member.

The housing may have a fixing groove formed at one side thereof so as to be fixed to the intake manifold.

Advantageous Effects

In accordance with the embodiments of the present invention, as the solenoid valve is arranged in the housing, the external flow path connecting the solenoid valve and the actuator can be removed. Thus, the flow path for driving the operating unit can be simplified.

Furthermore, as the solenoid valve is arranged in the housing, the bracket for fixing the solenoid is not needed. Thus, not only the structure can be simplified, but also the weight can be reduced.

Furthermore, the solenoid valve and the housing may be integrated to shorten the flow path between the solenoid valve and the operating unit. Thus, the flow path of the negative pressure connected to the operating unit can be reduced to improve the response performance of the actuator.

DESCRIPTION OF DRAWINGS

The above and other objects, features and other advantages of the present invention will be more clearly understood from the following detailed description taken in conjunction with the accompanying drawings, in which.

BEST MODE FOR INVENTION

An actuator for an intake manifold according to exemplary embodiments of the present invention will be described below in more detail with reference to the accompanying drawings.

Figure 4:
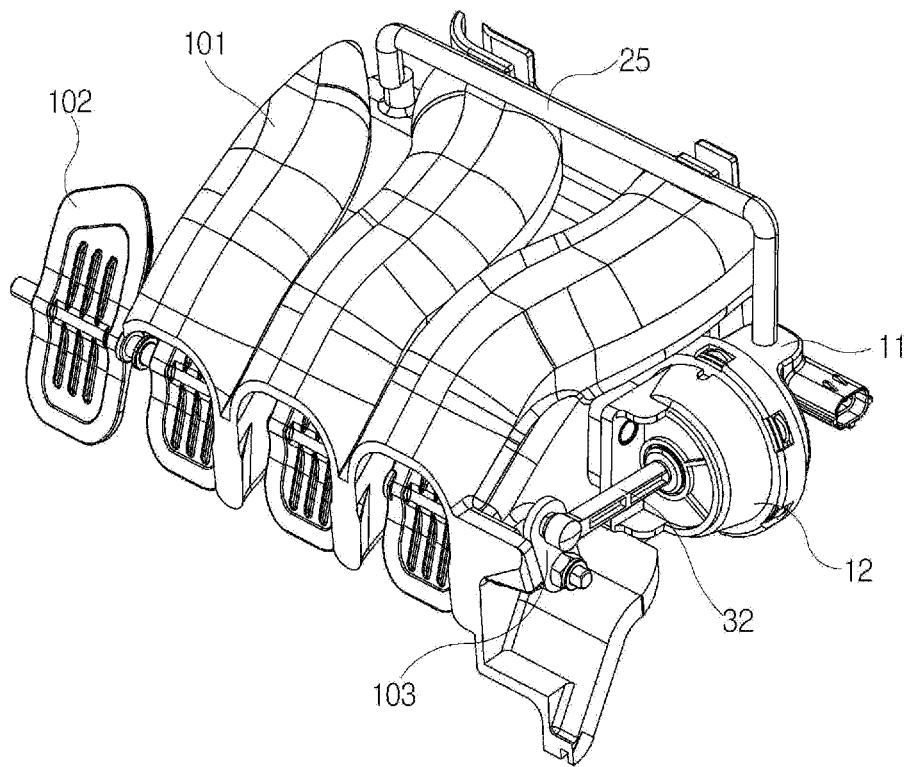
FIGS. 4 and 5 are perspective views of an actuator for an intake manifold according to an embodiment of the present invention.
Figure 5:
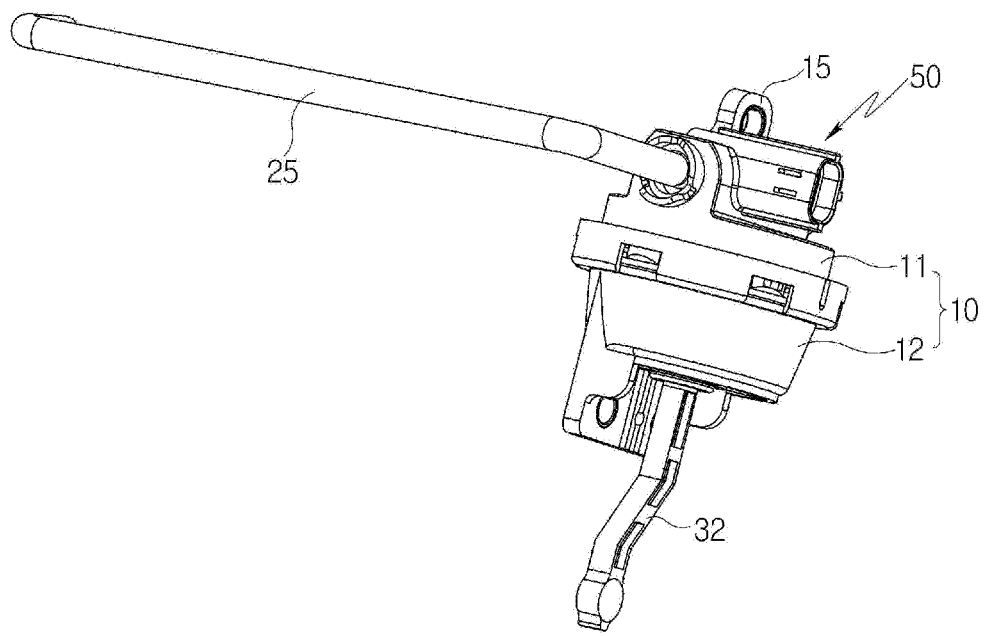
Figure 6:
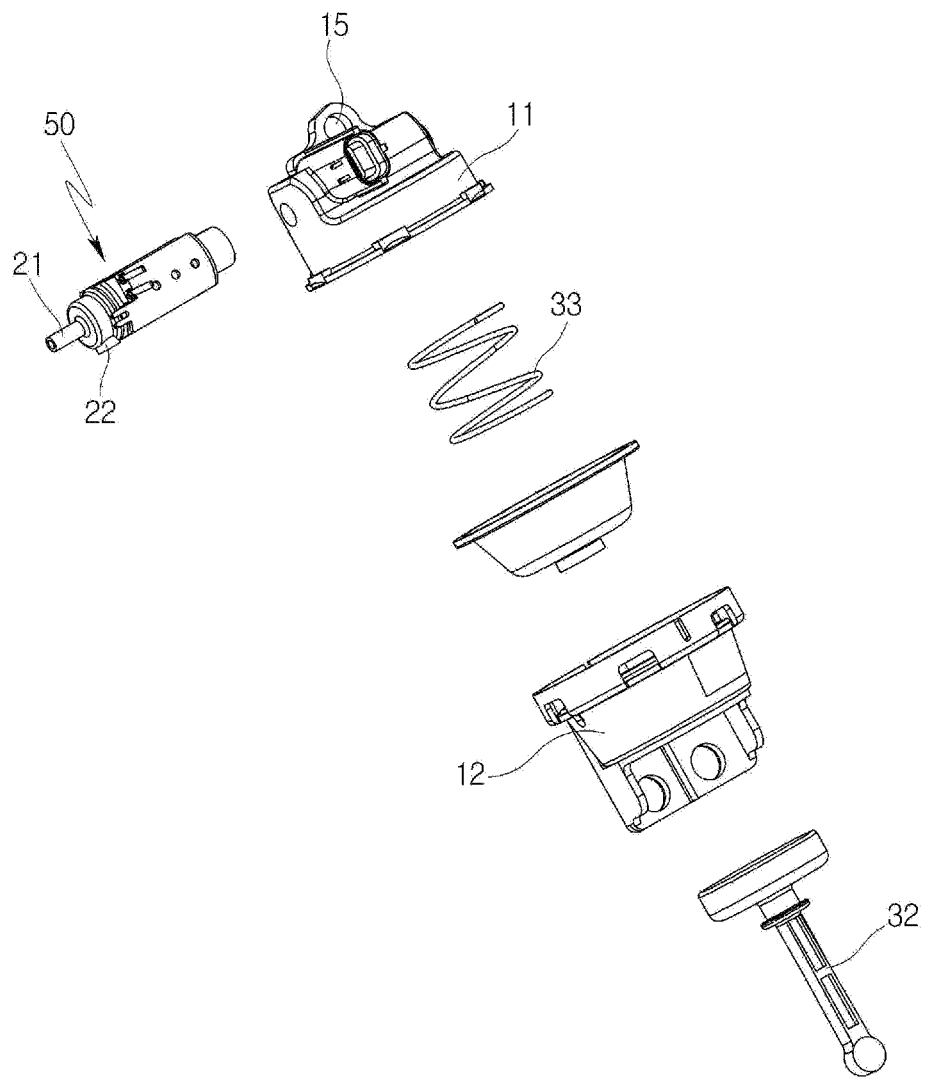
FIG. 6 is an exploded perspective view of the actuator for the intake manifold illustrated in FIG. 5.

Referring to FIG. 4, an actuator for an intake manifold according to an embodiment of the present invention rotates a variable valve 102 arranged in a runner of an intake manifold 101 of a vehicle such that an air intake path can be variably changed in the runner.

Referring to FIGS. 4 to 10, the actuator for an intake manifold according to the embodiment of the present invention includes a housing 10, an operating unit, and a solenoid unit. The housing 10 has a negative pressure space 13. The operating unit is operated by the pressure of air introduced into or discharged from the negative pressure space 13, and rotates the variable valve. The solenoid unit introduces and discharges air into and from the operating unit.

The housing 10 is divided into an upper housing 11 and a lower housing 12. The upper housing 11 and the lower housing 12 are independently manufactured and then coupled to each other. In the present embodiment, the upper housing 11 and the lower housing 12 are united to form the negative pressure space 13.

When the internal air of the negative pressure space 13 is discharged to a negative pressure supply source formed outside, the negative pressure space 13 is set in a negative pressure state. When external air is introduced into the negative pressure space 13, the negative pressure space 13 is set in an atmosphere pressure state. The negative pressure space 13 is coupled to the operating unit.

The operating unit includes an operating member 31, an operating bar 32, and an elastic spring 33. The operating member 31 is deformed by the pressure of air introduced into and discharged from the negative pressure space 13. The operating bar 32 is fixed and coupled to the operating member 31 and the variable valve 102. The elastic spring 33 restores the operating member 31.

The operating member 31 and the elastic spring 33 are installed in the negative pressure space 13, and the operating bar 32 protrudes to the outside of the lower housing 12 in a state where the operating bar 32 is supported by the elastic spring 33 and the operating member 31. The operating bar 32 has a leading end coupled to a link unit 103 for driving the variable valve 102.

Figure 9:
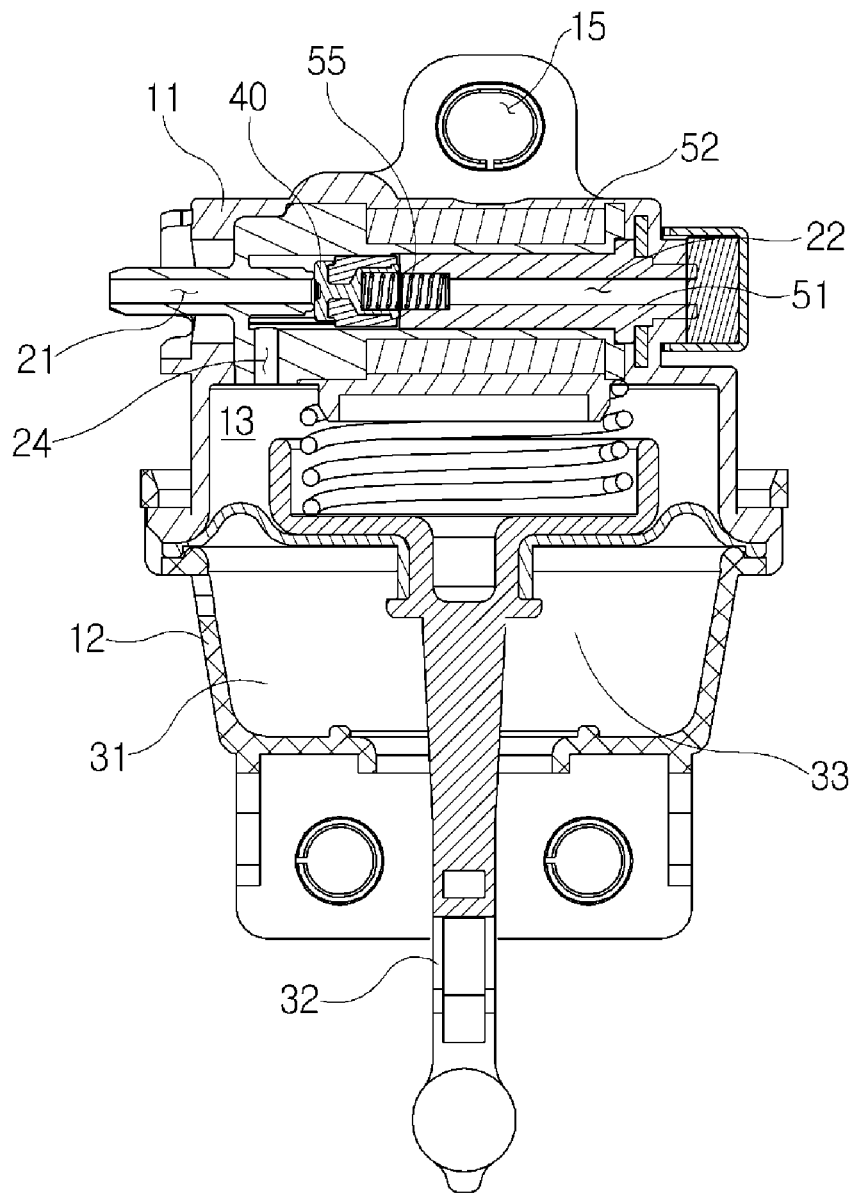

As illustrated in FIG. 9, when a negative pressure (vacuum state) is applied to the negative pressure space 13, the operating member 31 and the elastic spring 33 are contracted. Then, the operating bar 32 is moved in the longitudinal direction thereof, and drives the link unit 103 to rotate the variable valve 102, such that the air intake path can be varied in the runner of the intake manifold 101.

The upper housing 11 includes an exhaust flow path 21, an intake flow path 22, a spool hole 23, and an air entry and exit flow path 24, and they communicate with each other in the inside of the upper housing 11.

The exhaust flow path 21 is connected to the external negative pressure supply source through an exhaust pipe 25, and discharges the air of the negative pressure space 13 to the exhaust pipe 25 through the spool hole 23 and the air entry and exit flow path 24.

The intake flow path 22 serves as a path through which the air outside the housing 10 is introduced, and introduces the external air into the negative pressure space 13 through the spool hole 23 and the air entry and exit flow path 24, thereby raising the pressure of the negative pressure space 13.

The spool hole 23 is connected to the exhaust flow path 21 and the intake flow path 22, and houses the valve body 40.

The air entry and exit flow path 24 is formed in the housing 10 so as to communicate with the negative pressure space 13 and the spool hole 23.

Figure 1:
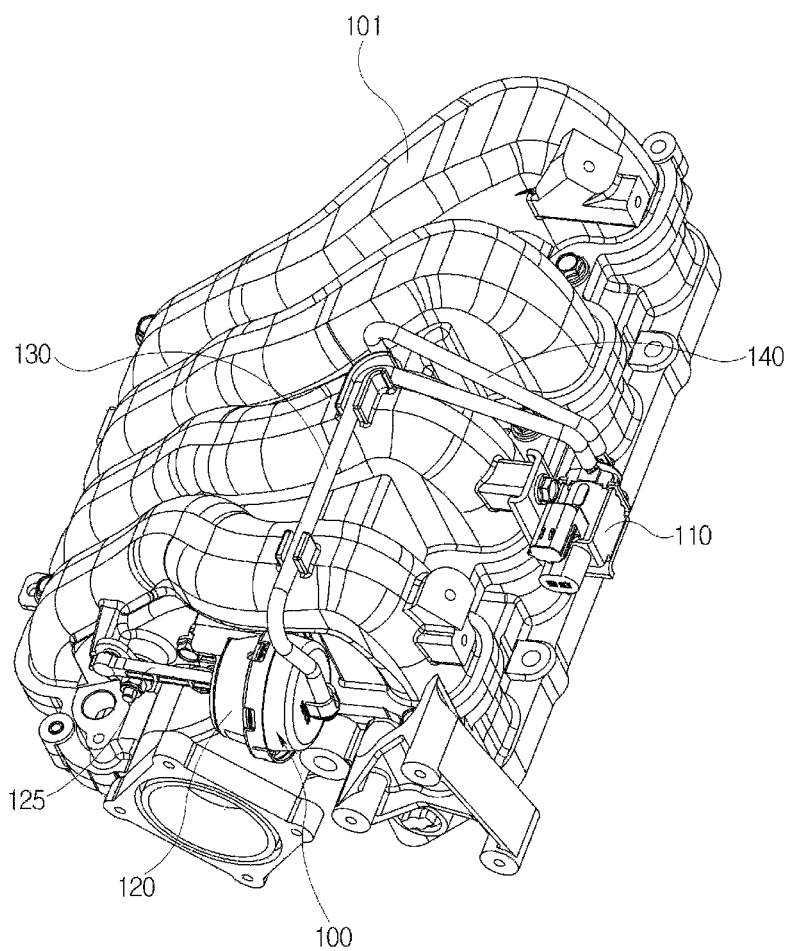
FIGS. 1 and 2 are perspective views of a conventional actuator for an intake manifold.
Figure 2:
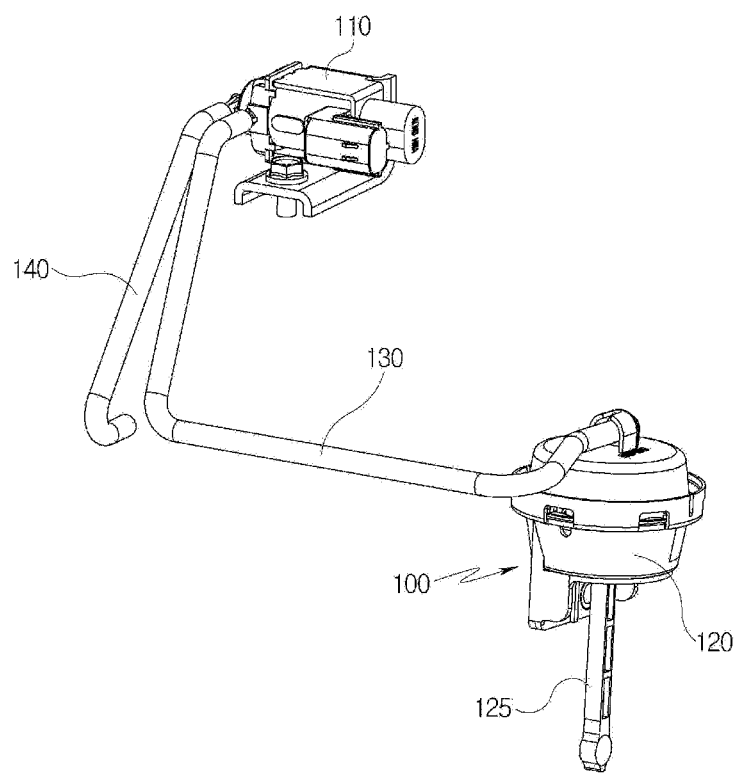

As the exhaust flow path 21, the intake flow path 22, the spool hole 23, and the air entry and exit flow path 24 are formed in the upper housing 11, the first flow path 130 connecting the operating unit 120 and the solenoid unit 110 in FIG. 1 can be removed from the conventional structure in which the operating unit 120 and the solenoid unit 110 are separated from each other. Thus, the flow path for driving the actuator can be simplified. As a result, the flow path of the negative pressure can be shortened to improve the response performance of the operating unit.

As illustrated in FIGS. 7 to 10, the valve body 40 is slidably installed in the spool hole 23, and selectively opens/closes the exhaust flow path 21 and the intake flow path 22. The valve body 40 is operated by the solenoid unit.

The solenoid unit includes a coil 52, a core 51, and an elastic member 55. The coil 52 is formed outside the core 51. The core 51 moves the valve body 40 using an electromagnetic force generated when a current is applied to the coil 52. The elastic member 55 restores the valve body 40.

The core 51 is installed in a bobbin 53, and the coil 52 is wound around the outside of the bobbin 53. The intake flow path 22 is formed through one side of the core 51. That is, the core 51 is formed in a tube shape through which the external air is introduced into the spool hole 23.

The elastic member 55 is a spring having a restoring force to push the valve body 40 with respect to the core 51. Thus, when the current applied to the coil 52 is blocked, the attractive force is removed, and the valve body 40 is isolated from the core 51 by the restoring force of the elastic member 55.

Figure 7:
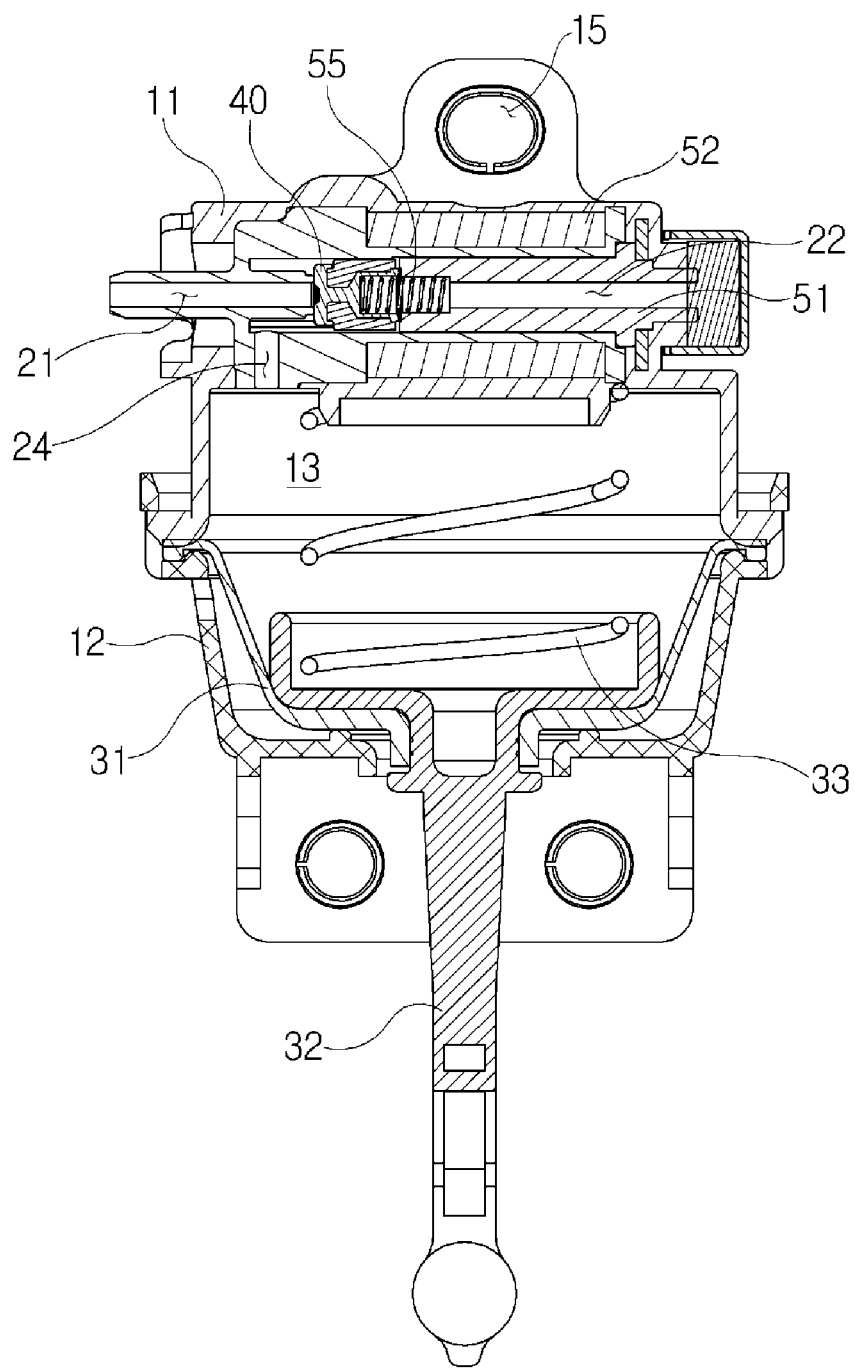
FIGS. 7 to 10 are cross-sectional views of the actuator for the intake manifold illustrated in FIG. 5.
Figure 8:
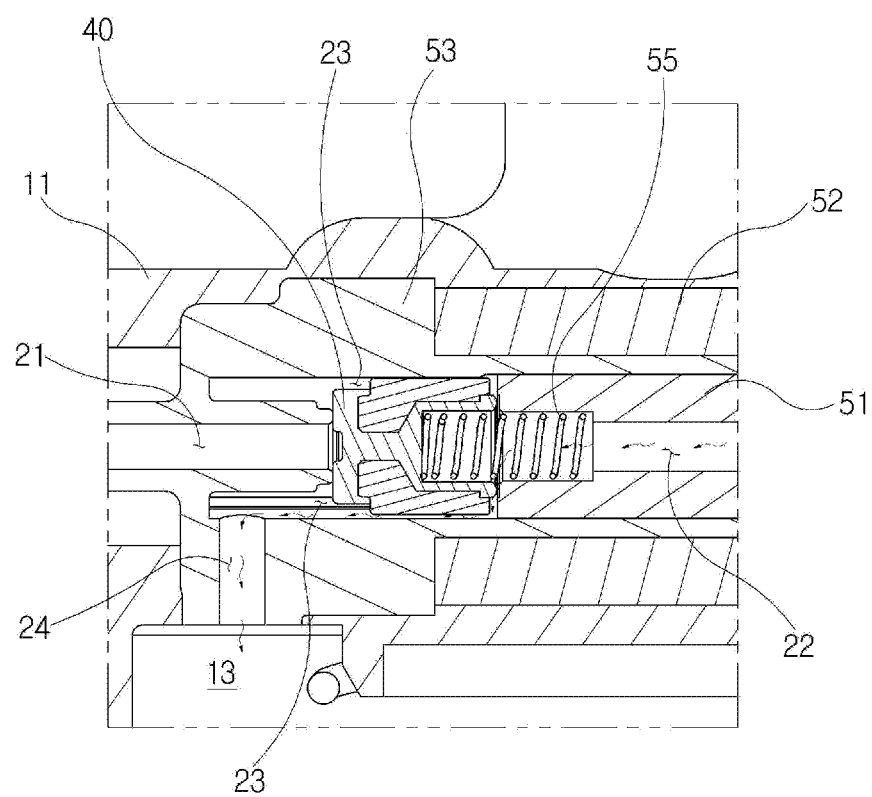
Figure 10:
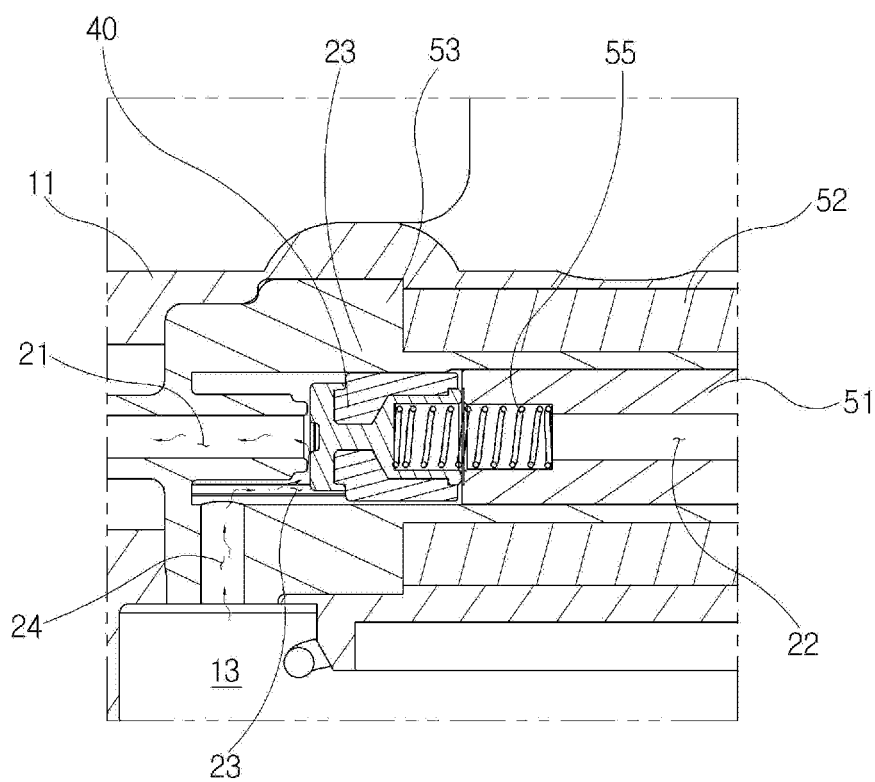

FIGS. 7 and 8 illustrate the state in which no current is applied to the coil 52, and FIGS. 9 and 10 illustrate the state in which a current is applied to the coil 52.

When no current is applied to the coil 52 as illustrated in FIG. 8, the valve body 40 is moved toward the exhaust flow path 21 by the restoring force of the elastic member 55, and closes the exhaust flow path 21. At this time, the leading end of the exhaust flow path 21 is opened to introduce external air into the spool hole 23. When the external air is introduced into the negative pressure space 13, the pressure of the negative pressure space 13 is raised to restore the operating member 31 and the elastic spring 33 while advancing the operating bar 32.

When a current is applied to the coil 52 as illustrated in FIG. 10, an electromagnetic force is generated to attract the valve body 40 toward the core 51. Then, the intake flow path 22 is closed. At this time, as the exhaust flow path 21 is opened, the internal air of the negative pressure space 13 is sequentially passed through the air entry and exit flow path 24 and the spool hole 23 and discharged to the exhaust flow path 21. Thus, the operating member 31 and the elastic member 55 are contracted to retreat the operating bar 32.

The upper housing 11 is over-molded to surround the outside of the solenoid unit. That is, the housing 10 is integrated with the solenoid unit 50 through an over-molding method such that the solenoid unit 50 is arranged in the housing 10. The upper housing 11 and the solenoid unit are coupled through the over-molding method such that the housing 11 covers the outside of the bobbin 53 around which the coil 52 is wound.

Figure 3:
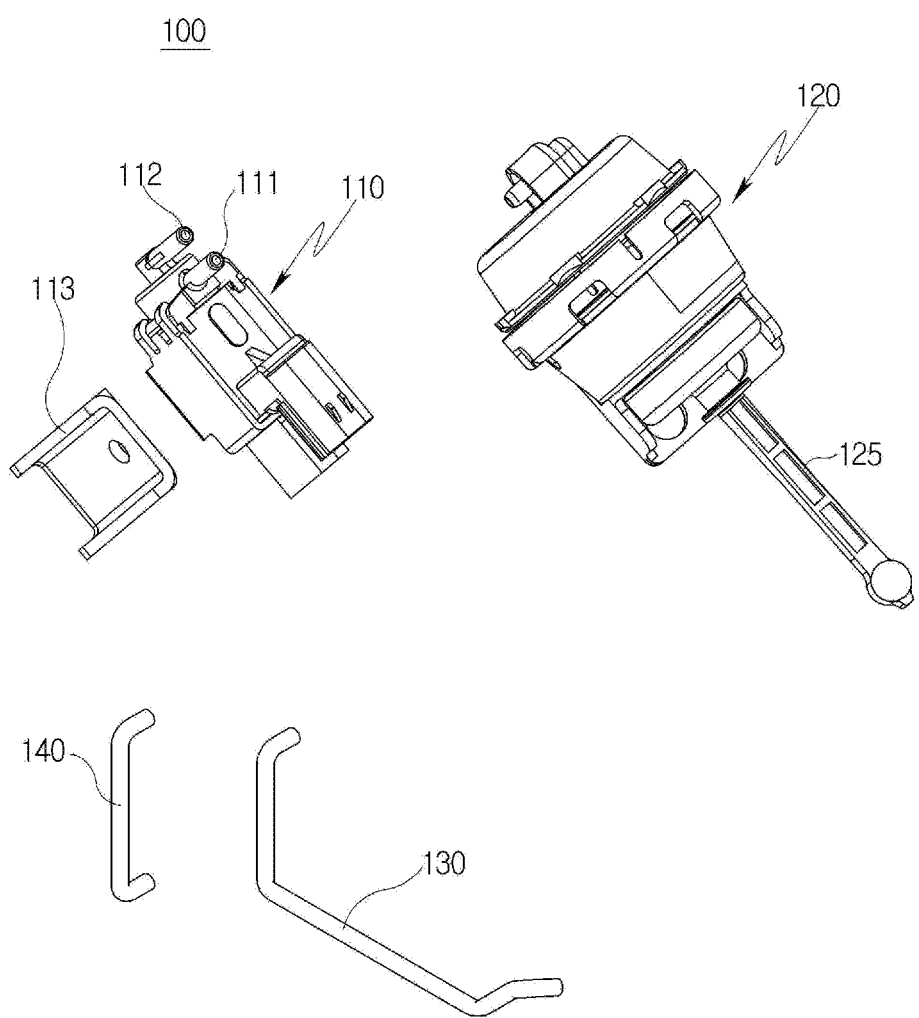
FIG. 3 is an exploded perspective view of the actuator for the intake manifold illustrated in FIG. 2.

When the solenoid unit is arranged in the housing 10, the bracket (113 of FIG. 3) for fixing the solenoid unit is not needed. As the bracket is removed, the entire weight can be reduced to improve the fuel efficiency.

The housing 11 has a fixing groove 15 formed at one side thereof so as to be fixed to the intake manifold 101. The housing 10 is fixed and coupled to the intake manifold 101 by a screw-coupling method through the fixing groove 15. The fixing groove 15 can support the weight of the solenoid valve 410 arranged in the housing 10, and fix the housing 10 to the intake manifold 101 such that vibration can be reduced during the operation of the solenoid valve 410.

While the present invention has been described with respect to the specific embodiments, it will be apparent to those skilled in the art that various changes and modifications may be made without departing from the spirit and scope of the invention as defined in the following claims.

The invention claimed is:

1. An actuator for an intake manifold, which rotates a variable valve arranged in a runner of an intake manifold of a vehicle so as to variably change an air intake path in the runner, the actuator comprising:
   an upper housing and a lower housing, wherein the upper housing and the lower housing are united to form a negative pressure space in which negative pressure is formed;
   an operating unit coupled to the negative pressure space and operated by the pressure of air introduced into and discharged from the negative pressure space, and rotating the variable valve;
   an exhaust flow path formed at one side of the upper housing, and connected to an external negative pressure supply source through an exhaust pipe such that negative pressure is formed in the negative pressure space;
   an intake flow path formed in the upper housing, and receiving external air which raises the pressure of the negative pressure space;
   a spool hole formed in the upper housing so as to communicate with the exhaust flow path and the intake flow path;
   an air entry and exit flow path formed in the upper housing so as to communicate with the negative pressure space and the spool hole;
   a valve body slidably installed in the spool hole, and selectively opening/closing the exhaust flow path and the intake flow path; and
   a solenoid unit operating the valve body,
   wherein the solenoid unit comprises:
      a bobbin installed in the upper housing and provided with the exhaust flow path, the intake flow path, the spool hole and the air entry and exit flow path;
      a coil wound around an outside of the bobbin;
      a core installed in the bobbin and moving the valve body using an electromagnetic force generated when a current is applied to the coil in order to selectively open or close the exhaust flow path and the intake flow path; and
      an elastic member restoring the valve body,
   wherein the upper housing is integrated with the solenoid unit through an over-molding method such that the upper housing covers the outside of the bobbin around which the coil is wound.

2. The actuator according to claim 1, wherein the intake flow path is formed through the core.

3. The actuator according to claim 1, wherein the operating unit comprises:
- an operating member deformed by the pressure of the air introduced into and discharged from the negative pressure space;
- an operating bar fixed and coupled to the operating member and the variable valve; and
- an elastic spring restoring the operating member wherein the operating bar protrudes to an outside of the lower housing in a state where the operating bar is supported by the elastic spring and the operating member.

4. The actuator according to claim 1, wherein the upper housing has a fixing groove formed at one side thereof so as to be fixed to the intake manifold.

\* \* \* \* \*